United States Patent

Mouskis et al.

[11] Patent Number: 6,145,788
[45] Date of Patent: Nov. 14, 2000

[54] DROGUE ASSEMBLY FOR IN-FLIGHT REFUELING

[75] Inventors: Christopher Mouskis, Bournmouth; Bryan John Edmondson, Wimborne, both of United Kingdom

[73] Assignee: Flight Refueling Limited, Dorset, United Kingdom

[21] Appl. No.: 09/450,336

[22] Filed: Nov. 29, 1999

Related U.S. Application Data

[63] Continuation of application No. PCT/GB98/01535, May 27, 1998.

[30] Foreign Application Priority Data

May 27, 1997 [GB] United Kingdom ............... 9710879

[51] Int. Cl.[7] .................................................. B64D 37/00
[52] U.S. Cl. ................. 244/135 A; 244/113; 244/142; 244/152
[58] Field of Search ........................ 244/110 R, 110 D, 244/113, 142, 152, 135 A, 138 R

[56] References Cited

U.S. PATENT DOCUMENTS

| | | | |
|---|---|---|---|
| 2,823,881 | 2/1958 | Patterson | 244/135 A |
| 2,946,543 | 7/1960 | Gordon et al. | 244/135 |
| 3,048,357 | 8/1962 | Loedding | 244/135 A |
| 3,098,630 | 7/1963 | Connors | 244/113 |
| 5,255,877 | 10/1993 | Lindgren et al. | 244/135 A |
| 5,427,333 | 6/1995 | Kirkland | 244/135 |

Primary Examiner—Galen L. Barefoot
Attorney, Agent, or Firm—Finnegan, Henderson, Farabow, Garrett, Dunner, L.L.P.

[57] ABSTRACT

A drogue assembly (10) for in flight refueling includes a circumferenal array of triangular support arms which carry a drogue parachute (29) which extends circumferentially around their shorter sides. Each support arm is pivoted and mounted on a pivot pin (19) at its apex for pivotal movement in a radial direction. At least alternate ones of the support arms carry leaf springs which extend into pockets (51) formed in the drogue parachute (29). The leaf springs act on the drogue parachute (29) in opposition to air pressure loading on it in flight so that it tends to increase the chord angle of the drogue parachute (29) from the leading edge. Hence the effective area of the drogue parachute in flight is varied automatically above a certain predetermined minimum which depends on the dimensions of the trailing edge so it is reduced as air speed is increased and vice versa.

12 Claims, 8 Drawing Sheets

DROGUE ASSEMBLY FOR IN-FLIGHT REFUELING

This application is a continuation of International Application No. PCT/GB98/01535, filed May 27, 1998, the content of which is incorporated herein by reference.

This invention relates to a drogue assembly for in-flight refueling.

Drogues are used to stabilise refuelling hose trailing from a tanker aircraft in a generally horizontal attitude. They provide drag for a refuelling coupling at the trailing end of the refuelling hose which is to be coupled for in-flight refuelling with a probe from a following aircraft which is to be refuelled. This drag resists the forward movement of the probe. However, the resistance due to drag should not be so great that the probe may be damaged by impact with the drogue in flight. Also the higher the drag, the greater the power that will be necessary to wind in the refuelling hose after in-flight refuelling has been completed.

It is desirable to be able to use the same in-flight refuelling equipment to refuel either a low speed aircraft, say a helicopter cruising at about 100 knots, or a higher speed aircraft where the speed of refuelling may be governed by the cruising speed of the tanker aircraft, say 270 knots. This is difficult if the equipment has a drogue parachute because drag load on the parachute is proportional to the square of the airspeed.

U.S. Pat. No. 2,946,543 discloses a drogue assembly for in-flight refuelling including a drogue parachute which comprises an annular strip of sheet material having two circumferentially continuous edges, and means for towing the drogue parachute in flight so that it is extended with one of its edges leading the other and encircling an area which is larger than the area encircled by the other when the drogue parachute is fully extended whereby the material presents a certain effective area to air through which it is being towed, the towing means being connected to the leading edge substantially uniformly around it and a notional line which lies in a radial plane of the drogue parachute and which passes through the two edges makes a certain chord angle with the direction of flight. A number of beams are connected to the edges at circumferentially spaced intervals and each of an annular array of coil springs acts through a respective one of the beams in opposition to air pressure loading on the drogue parachute in flight so as to increase the chord angle of the drogue parachute such that the effective area of the drogue parachute in flight is varied automatically above a certain predetermined minimum which depends upon the dimensions of the other or trailing edge, so that it is reduced as the air speed is increased and vice versa. This arrangement is complex requiring many parts and is vulnerable to those parts being broken in flight due to impact by the probe of a following aircraft which is to be refuelled. This can lead to engine damage as such broken parts may be dislodged from the drogue assembly and drawn into an engine air intake. Furthermore the drogue assembly that forms the subject of U.S. Pat. No. 2,946,543 is designed for relatively high speed flight and drag it exerts would be relatively low, too low for the range of airspeeds referred to above.

An object of this invention is to minimise the range of drag loads established by a drogue parachute when conducting in-flight refuelling with the same in-flight refuelling equipment at different air speeds and to avoid using complex equipment having many parts which are vulnerable to fracture due to impact by the probe of a following aircraft which is to be refuelled.

According to this invention there is provided a drogue assembly for in-flight refuelling including a drogue parachute which comprises an annular strip of sheet material having two circumferentially continuous edges, and means for towing the drogue parachute in flight so that it is extended with one of its edges leading the other and encircling an area which is larger than the area encircled by the other when the drogue parachute is fully extended whereby the material presents a certain effective area to air through which it is being towed, the towing means being connected to the leading edge substantially uniformly around it, and a notional line which lies in a radial plane of the drogue parachute and which passes through the two edges makes a certain chord angle with the direction of flight, resilient biasing means being provided which act on the material substantially uniformally around it and in opposition to air pressure loading on it in flight so as to tend to increase the chord angle such that the effective area of the drogue parachute in flight is varied automatically above a certain predetermined minimum which depends upon the dimensions of the other or trailing edge so that it is reduced as air speed is increased and vice versa, wherein the resilient biasing means are incorporated in the drogue parachute.

Preferably the resilient biasing means that are incorporated in the drogue parachute comprise spring means.

The preferred form of towing means comprise a circumferential array of support arms, each pivotally mounted at one end by a respective pivot mounting, the pivot mountings being arranged in a ring from which the support arms extend in one direction which is generally parallel to an axis with which the array is concentric, each support arm being mounted so as to be pivotable in a direction which is radial with respect to said axis, wherein each of the support arms is fitted to the leading edge of the drogue parachute, the arrangement being such that the support arms with the drogue parachute thereon can be collapsed within a cylindrical envelope having a diameter which is approximately that of the ring of pivot mountings, whereas when the drogue assembly is towed in-flight, it is extended in the manner of a parachute with the support arms flared outwardly from the axis trailing the ring of pivot mountings.

Conveniently the resilient biasing means comprise an annular array of leaf springs, each leaf spring of the annular array being fixed by one end to a respective one of the support arms in the region of the leading edge of the annular strip of sheet material and projecting radially with respect to that annular strip. Preferably each leaf spring is curved in its naturally relaxed state so as to present a concave face to the respective support arm to which it is fixed and the other end of the curved spring is spaced from the respective support arm. This introduces a camber into the drogue parachute which increases the drag.

Each leaf spring may extend into a respective pocket formed on the annular strip of sheet material by a respective patch which is fastened to the annular strip of sheet material, the pocket having a mouth through which the respective leaf spring projects.

There may be one leaf spring for each support arm. Alternatively, the leaf springs may be fitted to alternate support arms in which case each support arm may carry two such leaf springs one laid upon the other.

Figure 1:
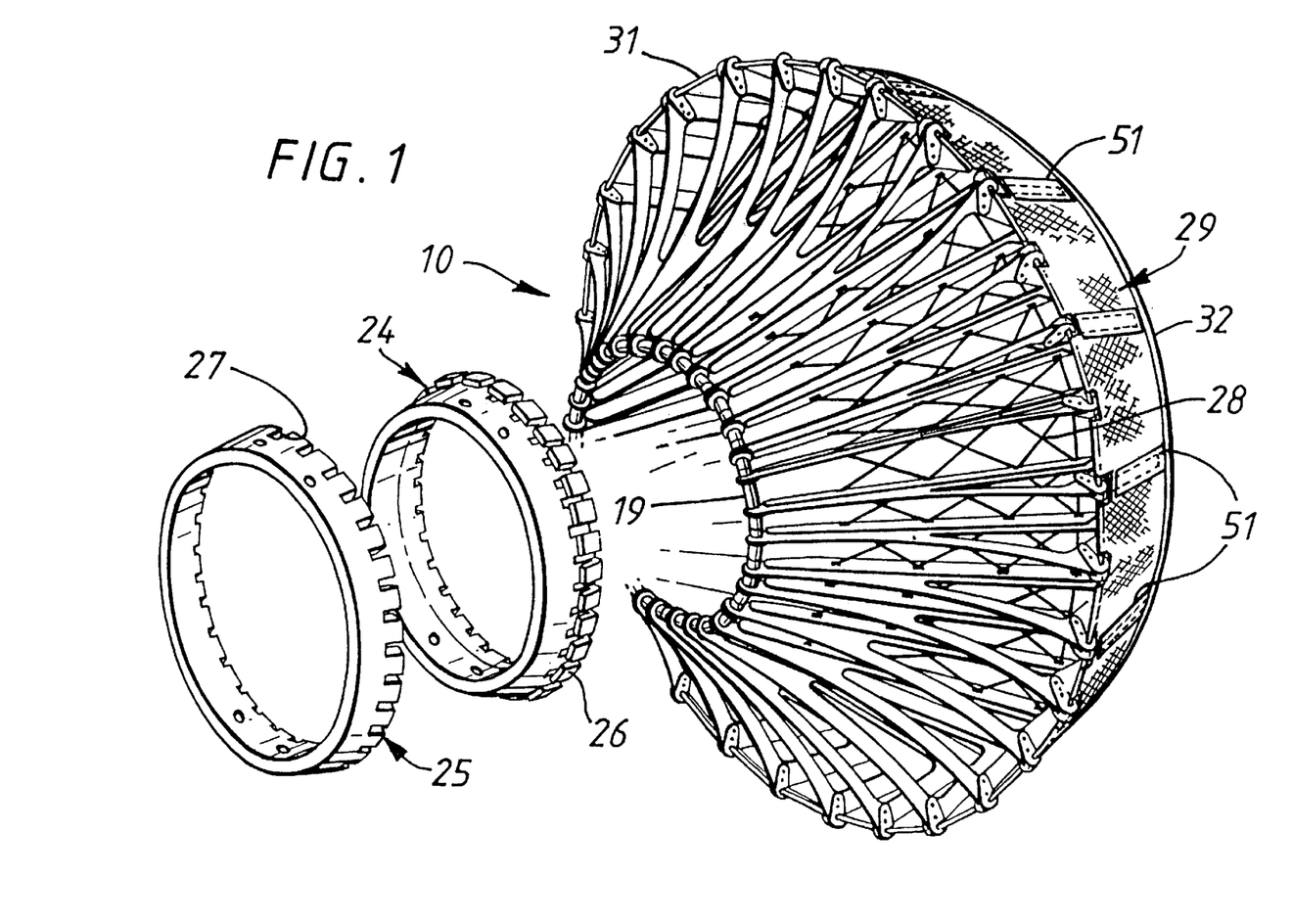
FIG. 1 is a general view in perspective of the drogue assembly with its clamping rings shown separately, displaced therefrom.

One form of drogue assembly in which this invention is embodied and some modifications thereof are described now by way of example only with reference to the accompanying drawings, of which:

FIG. 1 shows a drogue assembly 10 which comprises a circumferential array of support arms.

Figure 2:
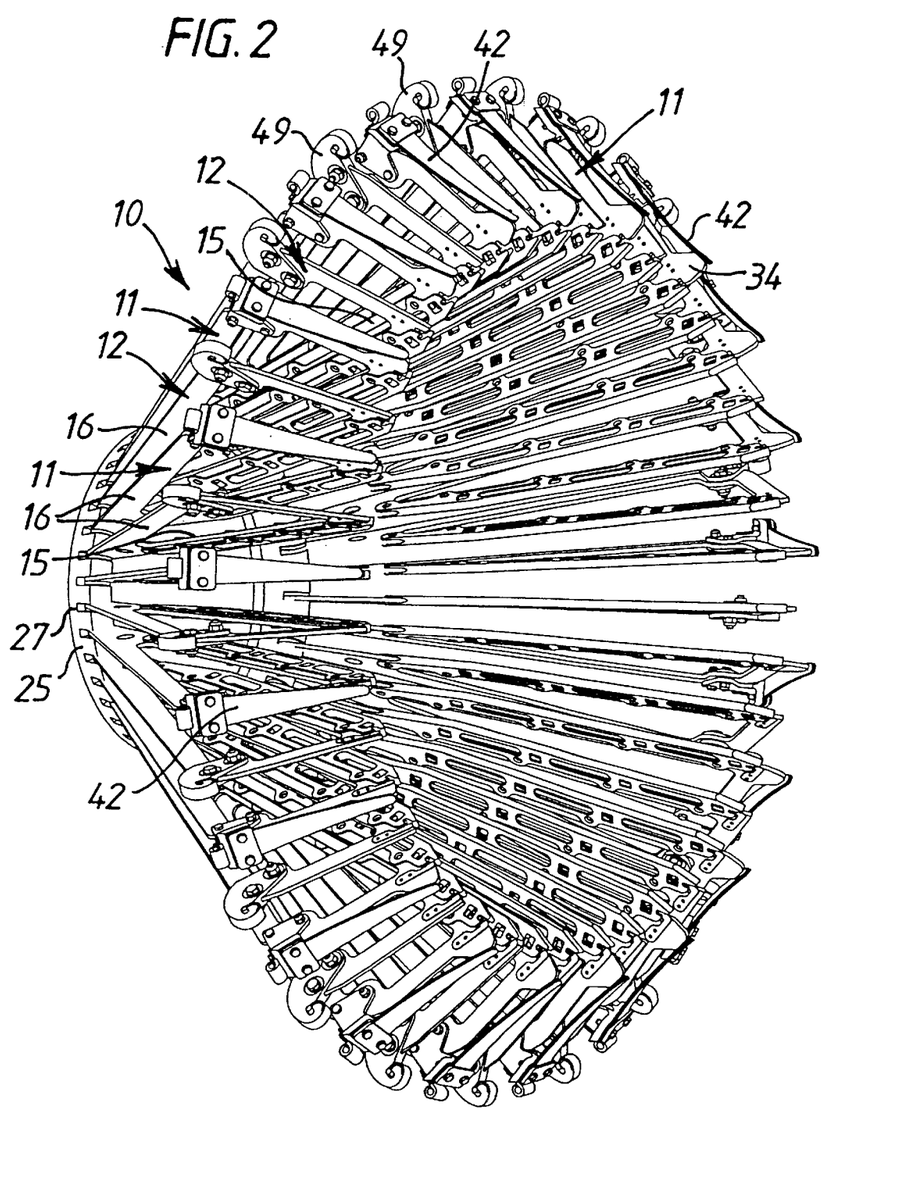
FIG. 2 is a view in perspective and to a larger scale of the drogue assembly shown in FIG. 1, with the clamping rings fitted and with the drogue parachute removed to reveal hidden details.

FIG. 2 shows that the circumferential array of support arms is alternately a support arm 11 and a support arm 12 so that each support arm 11 is between a pair of support arms 12. The support arms 11 and 12 are similar to a major extent, the differences being shown to the right-hand side of each of FIGS. 3 and 4.

Figure 3:
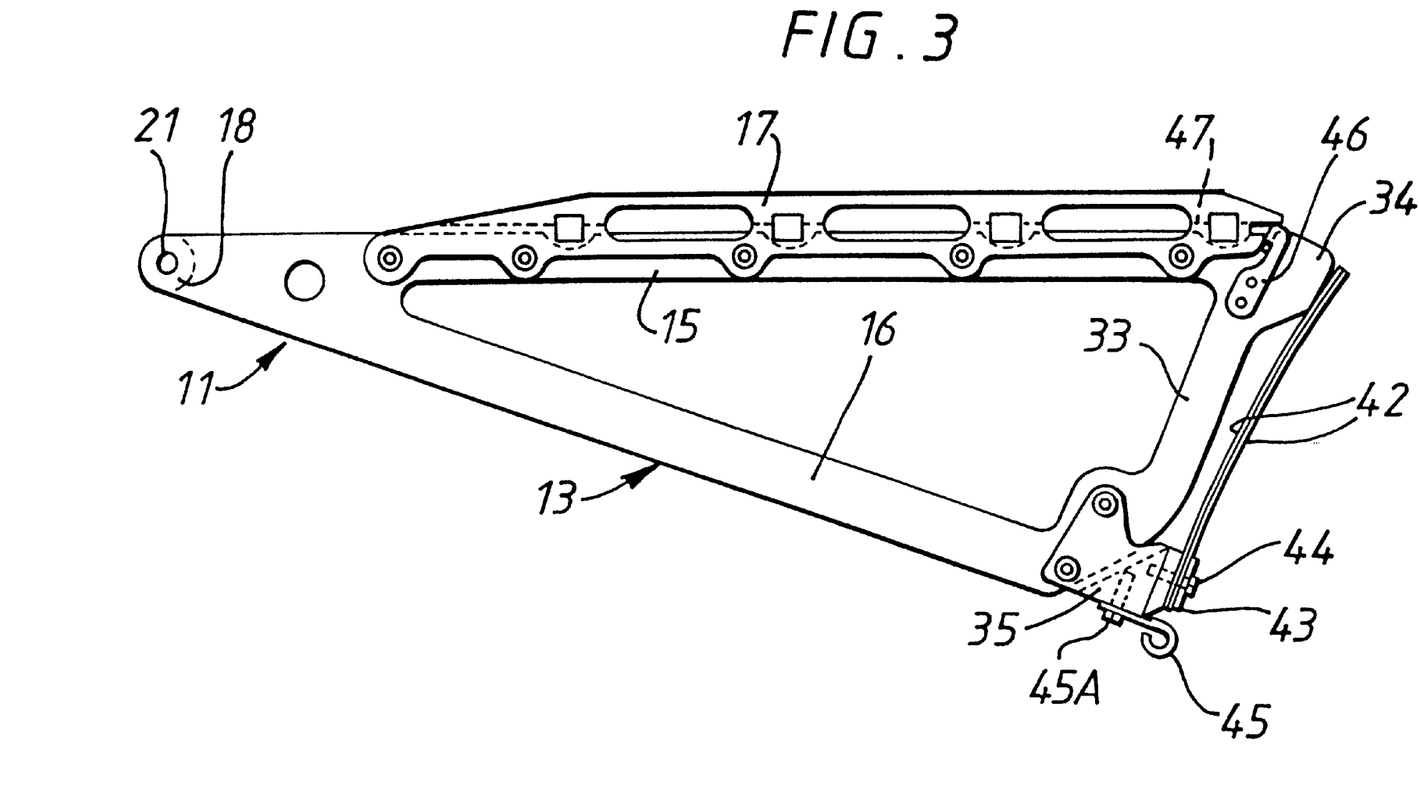
FIG. 3 is a side elevation of one of the support arms of the drogue assembly shown in FIGS. 1 and 2.
Figure 4:
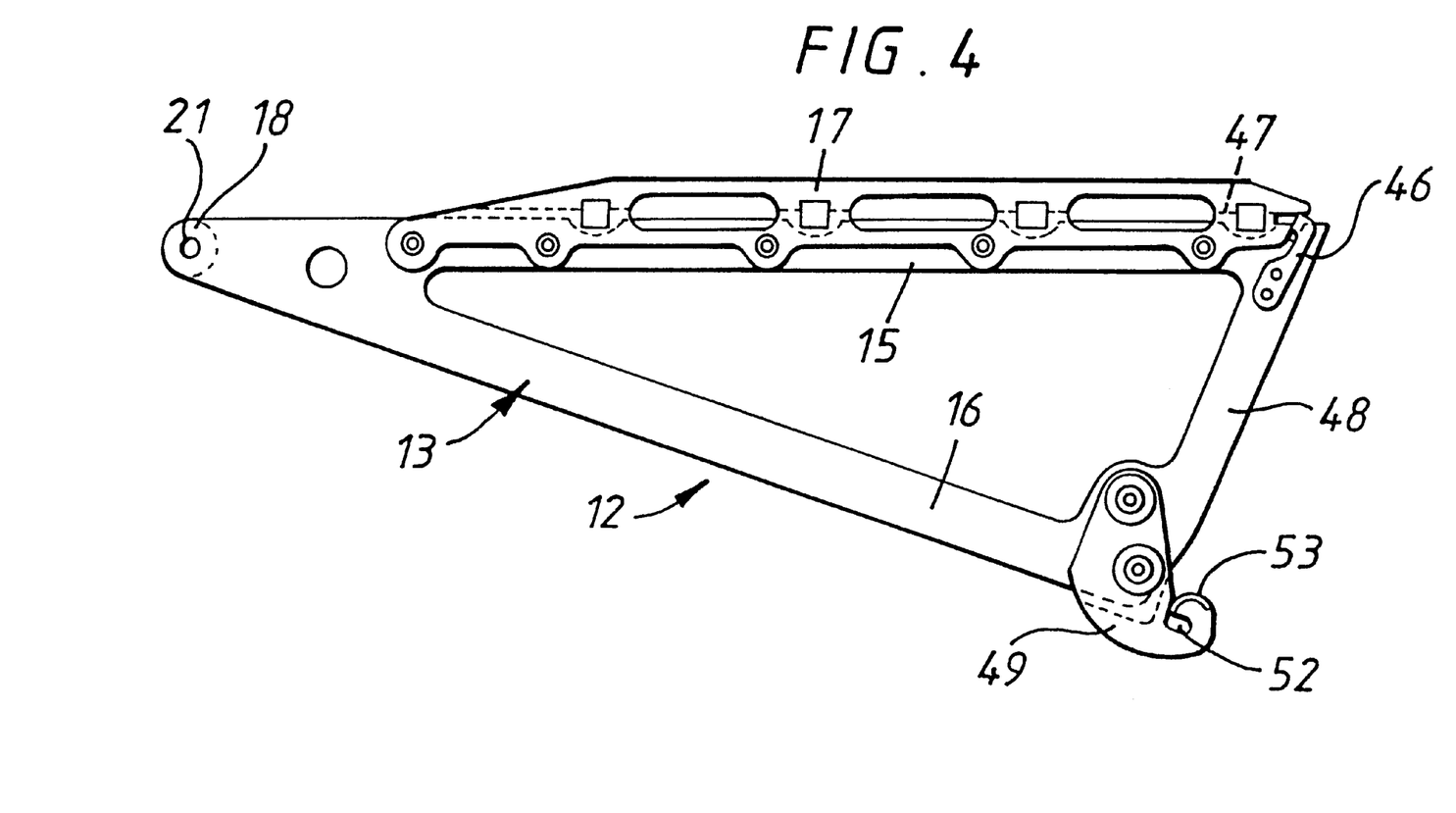
FIG. 4 is a side elevation of another of the support arms of the drogue assembly shown in FIGS. 1 and 2.

Each support arm 11 and 12 comprises a generally triangular metal frame 13 having a short side and two longer sides 15 and 16. One, 15 of those longer sides, which is a little longer than the other longer side 16, is disposed radially inwardly with respect to that other side 16 and is fitted into the channel of a metal channel section member 17. There is a clearance between the edge of the frame 13 within the channel and the base of that channel. The frame 13 is riveted to the channel section member 17.

Each support arm 11 and 12 is pivotally mounted in the region of its apex 18 which is formed by the two longer sides 15 and 16 for swinging movement in a radial direction. Each support arm 11, 12 is pivotally mounted on a pivot pin 19 which passes through a hole 21 in the frame 13 in the region of the apex 18. The pivot pins 19, which are arranged end-to-end in a ring, as can be seen in FIG. 1, are trapped between inner and outer clamp rings 24 and 25. The inner clamp ring 24 is castellated around its outer surface at one end so that it forms a circumferential array of abutments 26. The pivot pins 19 are held against the abutments 26 by the outer clamp ring 25 which is fitted over the remainder of the inner clamp ring 24 which projects through the ring of pivot pins 19. The outer clamp ring 25 which tapers away from the support arms 11 and 12, has an annular array of slots 27 formed in its larger diameter end, each slot 27 being aligned with a respective one of the support arms 11 and 12. The slots 27 are also aligned with the spaces between the abutments 26 and each slot 27 and the space with which it is aligned allows for the swinging movement of the aligned support arm 11 and 12. The rings 24 and 25 are bolted together with pivot pins 19 trapped between them. The pivot pins 19 are trapped between the clamp rings 24 and 25 in a manner which allows each support arm 11 and 12 to pivot independently of the others.

As is described in out co-pending International Patent Application PCT/GB98/00560, filed Mar. 4, 1998, priority British Patent Application No. 9704472.1, filed Mar. 4, 1997, each juxtaposed pair of support arms 11 and 12 is joined together by a net 28 which is joined to each of those support arms 11 and 12 at spaced intervals along the channel section member 17 of that support arm 11,12. The formation of the net 28 and the manner of its connection to the respective juxtaposed pair of support arms 11 and 12 that it interconnects is described in detail in our co-pending International Patent Application PCT/GB98/00560 and need not to be repeated here.

FIG. 1 shows that the support arms 11 and 12 carry a drogue parachute 29 which extends circumferentially around their short sides. The drogue parachute 29 comprises a circumferentially continuous strip of fabric which is reinforced along each of its axially spaced peripheral edges by a respective fabric cord hoop 31,32.

FIGS. 2, 3 and 4 show that each support arm 11 differs from each support arm 12 in the configuration of its short side and in the attachments that are fitted to it in the region of that short side.

FIG. 3 shows that the short side 33 of each support arm 11 is enlarged at the end that is connected to the longest side 15 to form a protuberance 34 which projects away from the apex 18. A block 35 is bolted to the support arm 11 at the junction of the short side 33 and the other, longer side 16. The block 35 is generally T-shaped. It has a slot formed substantially symmetrically and centrally within its stem and opening at the base of that stem. The junction between the short side 33 and the other, longer side 16 is received within the slot.

FIG. 3 shows that a pair of leaf springs 42, which are face-to-face one with the other, are clamped to the end of the T-shaped block 35 that forms the arms of the T, by a clamp plate 43 which is screwed to the block by setscrews 44. The remote end of the pair of leaf springs 42 abuts the protuberance 34. The dimensions of the latter are such that it deflects the leaf springs 42 from their flat natural relaxed condition so that the leaf springs 42 apply a preload to that protuberance 34.

A P-clip 45 is fixed to the block 35 by a setscrew 45A and is located on the side of that block 35 remote from the protuberance 34 so that its end, which is in the form of a partially closed loop, is in line with the leaf springs 42 from which it is displaced.

A retaining element 46 of spring metal is fastened to the side face of the short side 33 near to the protuberance 34. Its end remote from the block 35 is formed with a lateral flange which projects into a gap formed between the short side 33 and the longest side 15 of the support arm 11. That flange closes the adjacent end of the passage 47 which is formed by the space between the base of the channel section member 17 and the edge of the frame 13 so as to retain therein the pin (not shown) by which the net 28 is connected to the support arm 11 as described in our co-pending International Patent Application PCT/GB98/00560. In order to release the pin, the retaining element 46 is deflected so that the flange is withdrawn from the gap thus exposing the end of the passage 47 thereby enabling withdrawal of the pin.

FIG. 4 shows that each support arm 12 is provided with a similar retaining element 46 but no other fitting in the region of the junction of the short side 48 and the longest side 15. A hook element 49 of plastics material is secured to the frame 13 at the junction of its short side 48 and the other, longer side 16. The hook cavity of the hook element 49 faces the other end of the short side 48.

Figure 5:
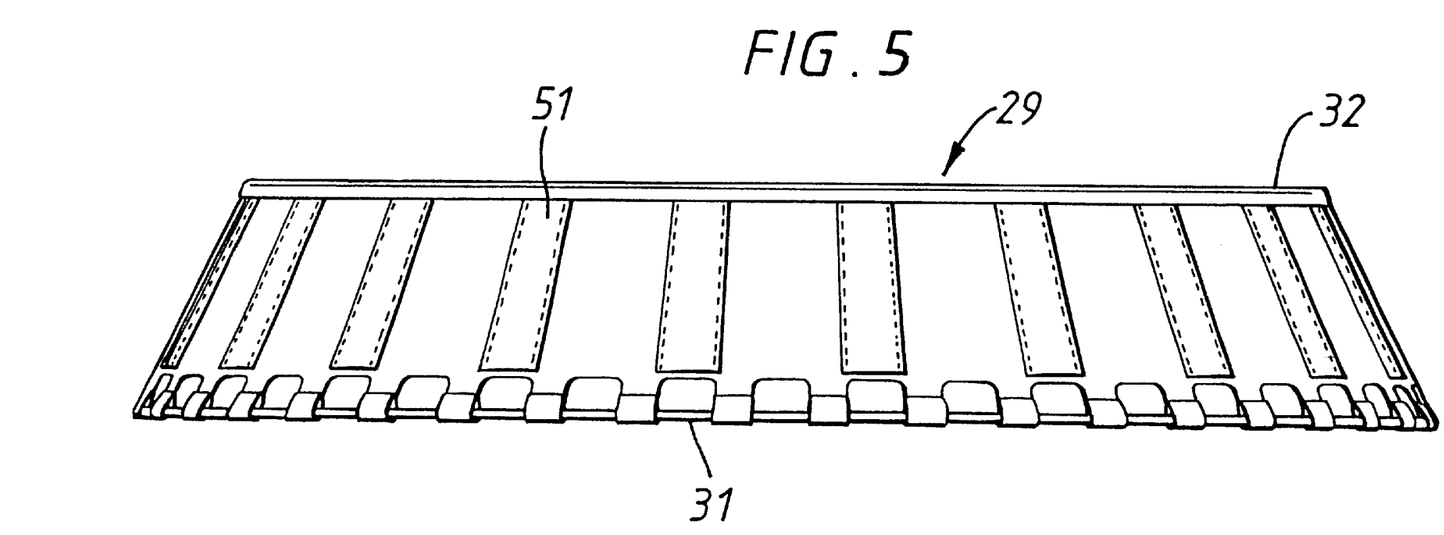
FIG. 5 is a side elevation of the drogue parachute shown in FIG. 1.

FIG. 5 shows that the fabric of the drogue parachute 29 is cut away at circumferentially spaced locations around its larger perimeter to reveal the respective cord hoop 31 that extends continuously around the perimeter. The hoop 31 is received within the cavities of the alternate P-clips 45 of the support arms 11 and hook elements 49 of the support arms 12 whereby the drogue parachute 29 is anchored to the array of support arms 11 and 12 around its larger perimeter. The drogue parachute 29 is provided with a circumferential array of pockets 51 which are formed by stitching respective fabric panels to its circumferentially continuous strip of fabric at circumferentially spaced intervals which are similar to the spacing of the support arms 11. Each pocket 51 is open at its end nearer to the larger perimeter and receives the respective pair of leaf springs 42 which projects into it from its anchorage on the respective block 35.

The exposed portions of the respective hoop 31 that are received within the cavities of the P-clips 45 and hook elements 49 are passed into those cavities during assembly. There is sufficient clearance at the mouth of the hook cavity of each hook element 49 for the hoop 31 to be passed through it during assembly. Each hoop 31 is retained in the respective hook cavity of a hook element 49 by an enlarged end 52 of a strap element 53 which is fitted into the hook cavity between the hoop 31 and the mouth of the hook cavity and which is too large to be passed through the mouth of the hook cavity. The enlarged end 52 of the strap element 53 was inserted into the hook cavity from one side thereof and is a sliding fit therein. The remainder of the strap element 53 extends from the enlarged end 52 through the mouth of the hook cavity and around the outer surface of the respective hook element 49 to which it is joined. The strap element 53, including its enlarged end 52 is integral with the respective hook element 49, the whole being a moulding of plastics material.

When the drogue assembly 10 is towed by an aircraft in flight, it is extended with the support arms 11 and 12 flared outwardly from the axis, trailing the ring of pivot pins 19, by the parachute action of the drogue parachute 29. Once the air pressure loading that acts upon the drogue parachute 29 as it is towed, exceeds the preload of the pairs of leaf springs 42, the circumferentially continuous fabric of the drogue parachute 29 acts on the leaf springs 42 to deflect them away from the abutments formed by the respective circumferential array of protuberances 34. As a result the effective area of the drogue parachute 29 presented to the slip-stream is reduced allowing air to spill past the radially inner perimeter of the drogue parachute 29. The deflection of the leaf springs 42 continues until an equilibrium state is established. The cord hoop 32 that extends circumferentially continuously around the radially inner periphery of the drogue parachute 29 limits deflection of the drogue parachute 29 away from protuberances 34. Such deflection of the drogue parachute 29 reduces the drag loading acting on the drogue assembly 10. Hence the drag loading varies inversely with the speed at which the drogue assembly 10 is towed.

If necessary all the support arms of the support array may be provided with respective leaf springs 42, each engaged within a respective pocket formed in the drogue parachute 29. In such a modification there need be only one leaf spring 42 for each support arm which may be a support arm otherwise as shown in FIG. 3. However, there would be a weight penalty were that arrangement to be adopted.

Figure 6:
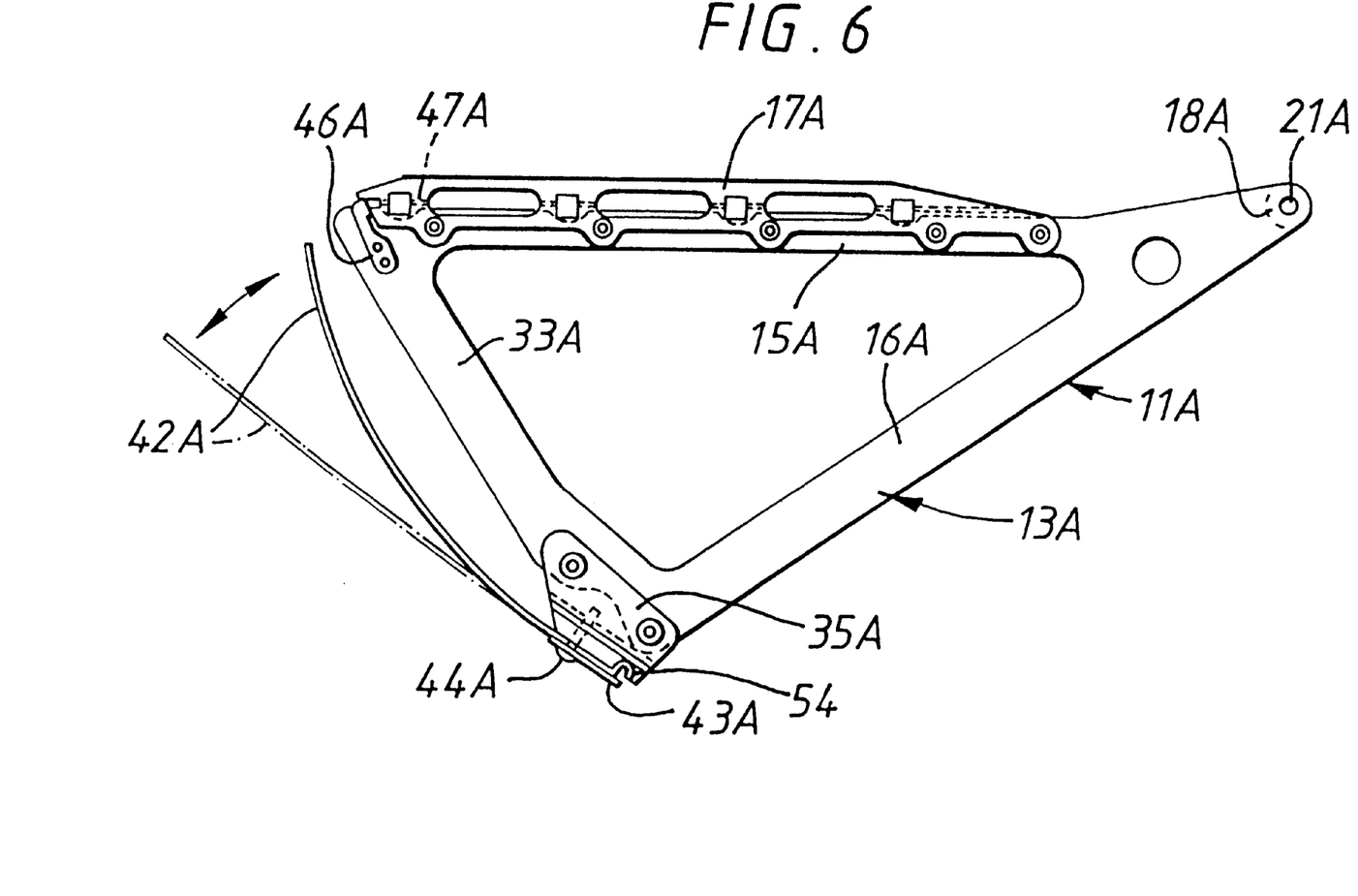
FIG. 6 is a view similar to FIG. 3, but drawn to the opposite hand, of a modified form of support arm fitted with a modified form of leaf spring.

We have realised that the pre-loaded, naturally flat leaf springs 42 restrict the extend to which the fabric of the drogue parachute 29 will inflate in flight so that the drag will be less than would have been the case had the fabric not been so restrained by the action of the leaf springs 42 incorporated therein. FIG. 6 shows another form of support arm which is preferred for use in place of the support arms 11 described above with reference to and as shown in FIG. 3 because it imparts a camber to the drogue parachute for low speed envelopes when the air pressure loading on the drogue parachute is insufficient to overcome the spring loading. Such a camber increases the drag.

The support arm shown in FIG. 6 is referenced 11A and parts of it which are similar to corresponding parts of the support arm 11 described above are identified in FIG. 6 by the same reference characters but with the suffix A. The following description is limited to the principal differences. Support arms 12A (not shown) used with support arms 11A will be geometrically similar to the support arms 11A shown in FIG. 6 and will differ in substantially the same way as has been described above with reference to FIG. 4.

The support arm 11A is designed for a drogue parachute which has a greater width between its circumferentially continuous edges than does the drogue parachute 29 carried by the support arms 11 and 12. This is the reason for the geometrical differences between the triangular frames 13 and 13A and follows from the support arm 11A being designed as part of a drogue assembly which is designed for a wider speed envelope, with lower speeds, than was the case for the drogue assembly 10 described above with reference to FIGS. 1 to 5.

The support arm 11A does not have a protuberance 34, nor is its block 35A fitted with a P-clip 45. The leaf spring 42A is curved in its natural relaxed state, rather than being flat as has been described above for the leaf spring 42 of the support arm 11. The curved leaf spring 42A presents a concave face to the short side 33A and its end remote form the block 35A is unsupported. The end face of the block 35A to which the leaf spring 42A is clamped forms a U-shaped channel 54 which is juxtaposed to the end edge of the leaf spring 42A but which is not covered by the leaf spring 42A. The channel 54 receives the hoop 31 and is covered by the clamp plate 43A whereby the hoop 31 is repainted in the channel 54.

It will be appreciated that the leaf springs 42A tend to straighten out to a substantially flat condition as is shown in chain-dotted lines in FIG. 6 when the air pressure loading on the drogue parachute 29 exceeds the loading of the leaf springs 42A.

Figure 7:
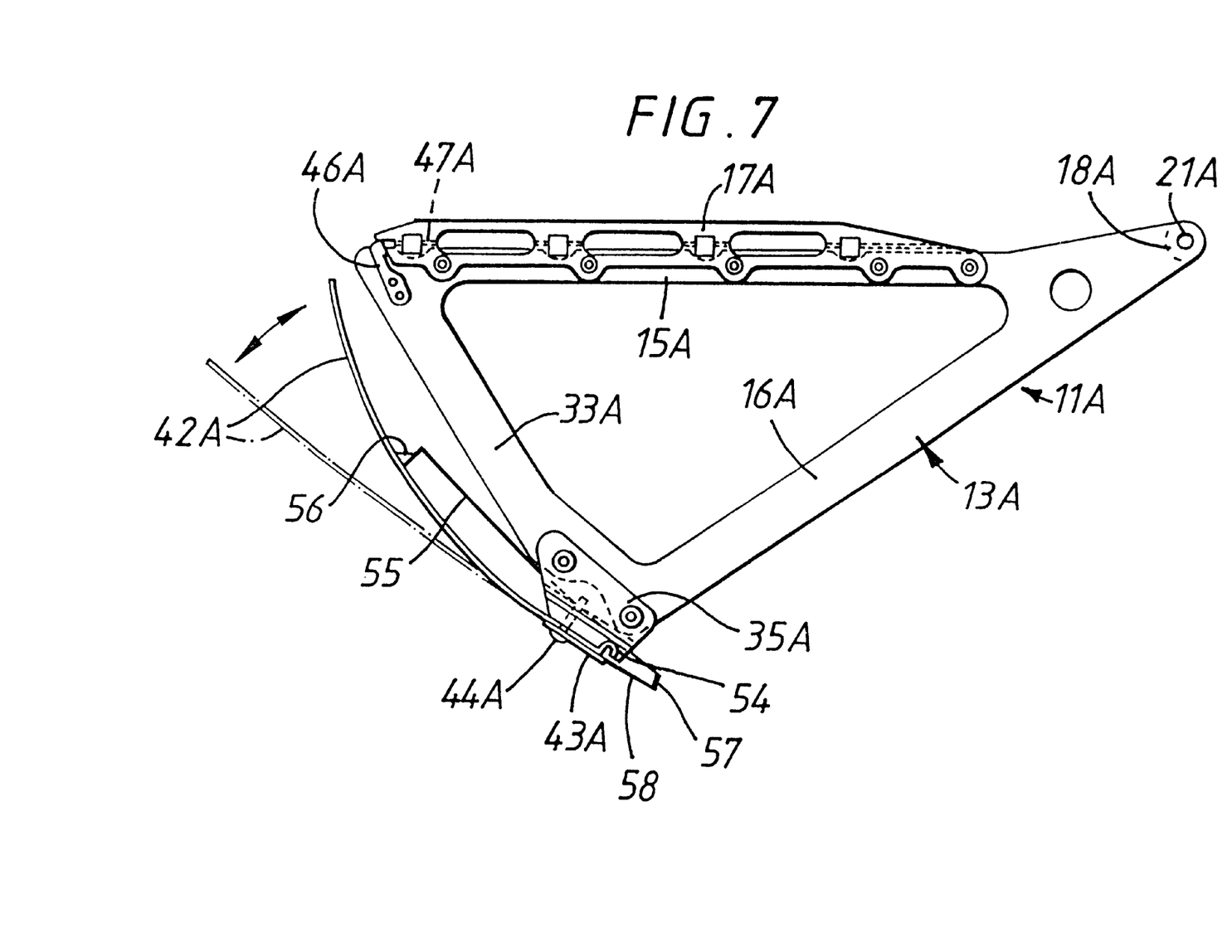
FIGS. 7 and 8 are views similar to FIG. 6 showing modifications of the support arm shown in FIG. 6.

FIG. 7 shows the support arm 11A fitted with a modification which is used with a modified form of drogue parachute 29A. The modification to the drogue parachute comprises the provision of an additional outwardly-flared annular skirt portion at the larger diameter end whereby the circumferentially-continuous strip of fabric that forms the drogue parachute is projected beyond the larger diameter hoop 31 and thus beyond the longer side 16A of each support arm 11A, 12A. The modification to the support arm 11A shown in FIG. 7 comprises the provision of a strut 55 which is fixed at one end 56 to the concave face of the leaf spring 42A intermediate its ends and which is fixed at its other end 57 to the larger diameter perimeter of the additional annular skirt portion 58 of the modified drogue parachute 29A.

This modification results in the larger diameter perimeter of the additional skirt portion of the modified drogue parachute 29A being deflected towards the longer sides 16A of the support arms 11A and 12A as the leaf springs 42A straighten out. This is due to the struts 55. Hence the struts 55 act to alter the camber of the drogue parachute 29A and the angle of attack at the leading edge of the drogue parachute 29A, that is to say the angle the leading edge portion makes with the airflow. These alterations to the camber and the angle of attack further reduce drag by aligning the leading edge portion of the drogue parachute with the airflow and further reducing the effective area of the drogue parachute.

Figure 8:
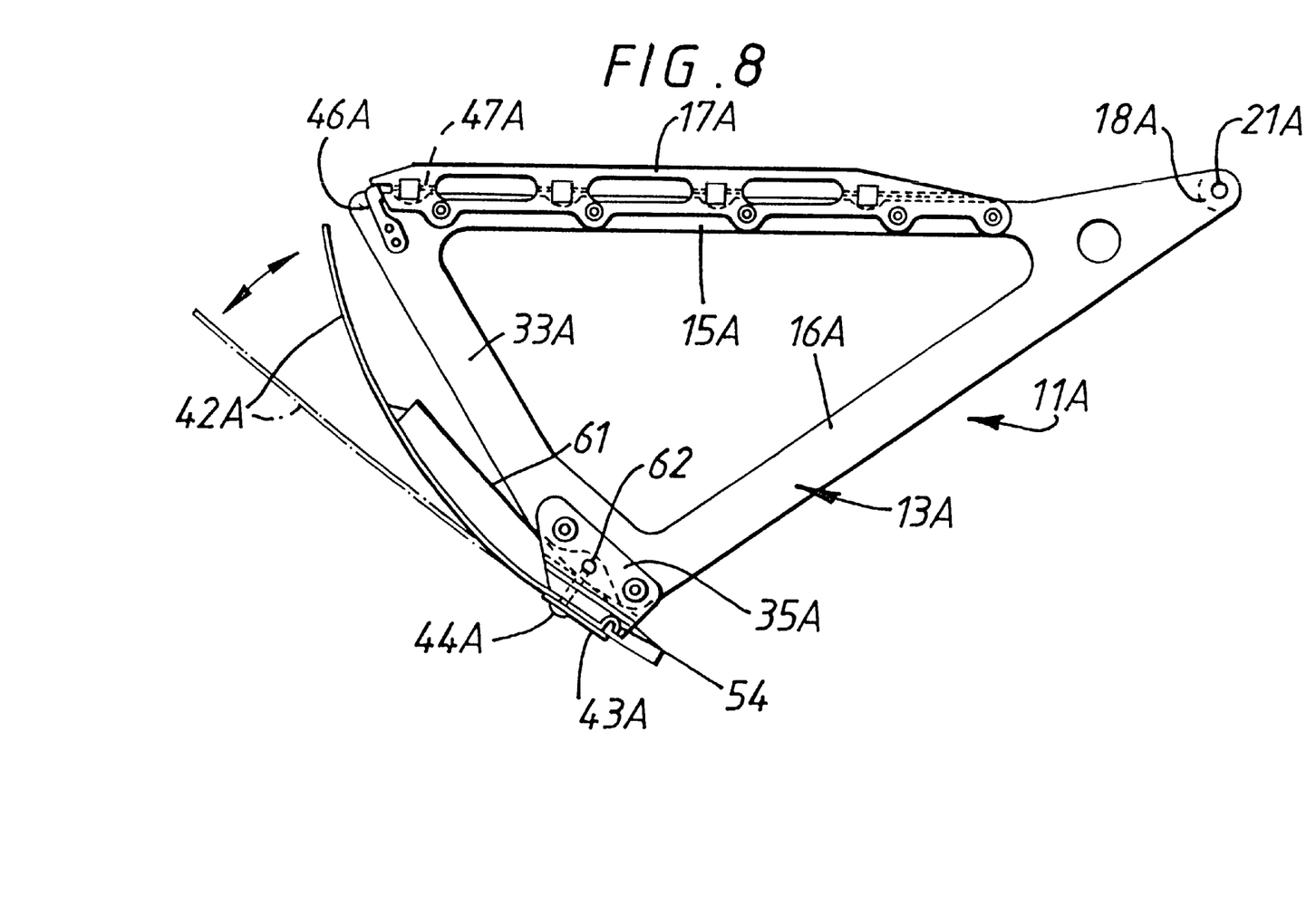

The strut 55 may be replaced by a beam 61, fixed at its ends to the leaf spring 42A and to the leading edge of the drogue parachute as described above with reference to FIG. 7, but pivotally mounted on the block 35A as shown at 62 in FIG. 8.

What is claimed is:

1. A drogue assembly for in-flight refueling including a drogue parachute comprising an annular strip of sheet material having leading and trailing circumferentially continuous edges, and means for towing the drogue parachute in flight so that it is extended with the leading edge encircling an area larger than an area encircled by the trailing edge when the drogue parachute is fully extended, whereby the material presents a certain effective area to air through which it is being towed, the towing means being connected to and substantially uniformly around the leading edge a notional line, lying in a radial plane of the drogue parachute and passing through the leading and trailing edges, making a certain chord angle with the direction of flight, wherein resilient biasing means are provided to act on and substantially uniformly around the material and in opposition to air pressure loading on the material in flight so as to tend to increase said chord angle such that the effective area of the drogue parachute in flight is varied automatically above a certain predetermined minimum which depends upon the dimensions of the trailing edge so that the effective area is reduced as air speed is increased and vice versa, said resilient biasing means being incorporate din the drogue parachute.

2. A drogue assembly according to claim 1 wherein said resilient biasing means that are incorporated in the drogue parachute comprise spring means.

3. A drogue assembly according to claim 1, wherein the drogue parachute is connected to the towing means only in the region of its leading edge, the trailing edge portion of the drogue parachute being urged towards the towing means by the resilient biasing means and being deflectable away from the towing means against the action of the resilient biasing means by air pressure loading on the drogue parachute.

4. A drogue assembly according to claim 2, wherein the drogue parachute is connected to the towing means only in the region of its leading edge, the trailing edge portion of the drogue parachute being urged towards the towing means by the resilient biasing means and being deflectable away from the towing means against the action of the resilient biasing means by air pressure loading on the drogue parachute.

5. A drogue assembly for in-flight refueling including a drogue parachute comprising an annular strip of sheet material having leading and trailing circumferentially continuous edges, and means for towing the drogue parachute in flight so that it is extended with the leading edge encircling an area larger than an area encircled by the trailing edge when the drogue parachute is fully extended, whereby the material presents a certain effective area to air through which it is being towed, the towing means being connected to and substantially uniformly around the leading edge, a notional line, lying in a radial plane of the drogue parachute and passing through the leading and trailing edges, making a certain chord angle with the direction of flight, wherein resilient biasing means are provided to act on and substantially uniformly around the material and in opposition to air pressure loading on the material in flight so as to tend to increase said chord angle such that the effective area of the drogue parachute in flight is varied automatically above a certain predetermined minimum which depends upon the dimensions of the trailing edge so that the effective area is reduced as air speed is increased and vice versa, said resilient biasing means being incorporated in the drogue parachute, wherein the towing means comprise a circumferential array of support arms, each pivotally mounted at one end by a respective pivot mounting, the pivot mountings being arranged in a ring from which the support arms extend in one direction generally parallel to an axis with which the array is concentric, each support arm being mounted so as to be pivotable in a radial direction with respect to said axis, wherein each of the support arms is fitted to the leading edge of the drogue parachute, the arrangement being such that the support arms with the drogue parachute thereon can be collapsed within a cylindrical envelope having a diameter approximately that of the ring of pivot mountings, whereas when the drogue assembly is towed in-flight, it is extended in the manner of a parachute with the support arms flared outwardly form the axis trailing the ring of pivot mountings.

6. A drogue assembly according to claim 5 wherein the resilient biasing means comprise an annular array of leaf springs, each leaf spring of the annular array being fixed by one end to a respective one of the support arms in the region of the leading edge of the annular strip of sheet material and projecting radially inwardly with respect to that annular strip.

7. A drogue assembly according to claim 6 wherein, in its natural relaxed state, each leaf spring is curved so as to present a concave face to the respective support arm to which it is fixed and the other end of the curved leaf spring is spaced from the respective support arm.

8. A drogue assembly according to claim 6 wherein each leaf spring extends into a respective pocket formed in the annular strip of sheet material by a respective patch which is fastened to the annular strip of sheet material, the pocket having a mouth through which the respective leaf spring projects.

9. A drogue assembly according to claim 6, wherein there is one leaf spring for each support arm.

10. A drogue assembly according to claim 6, wherein the leaf springs are fitted to alternate support arms.

11. A drogue assembly according to claim 10 wherein each support arm carries two leaf springs, one laid upon the other.

12. A drogue assembly according to claim 5, wherein the drogue parachute is connected to the towing means only in the region of its leading edge, the trailing edge portion of the drogue parachute being urged towards the towing means by the resilient biasing means and being deflectable away from the towing means against the action of the resilient biasing means by air pressure loading on the drogue parachute.

* * * * *